Aug. 19, 1958
A. O. FRANK ET AL
2,847,845
FLESHING TOOL
Filed June 1, 1956
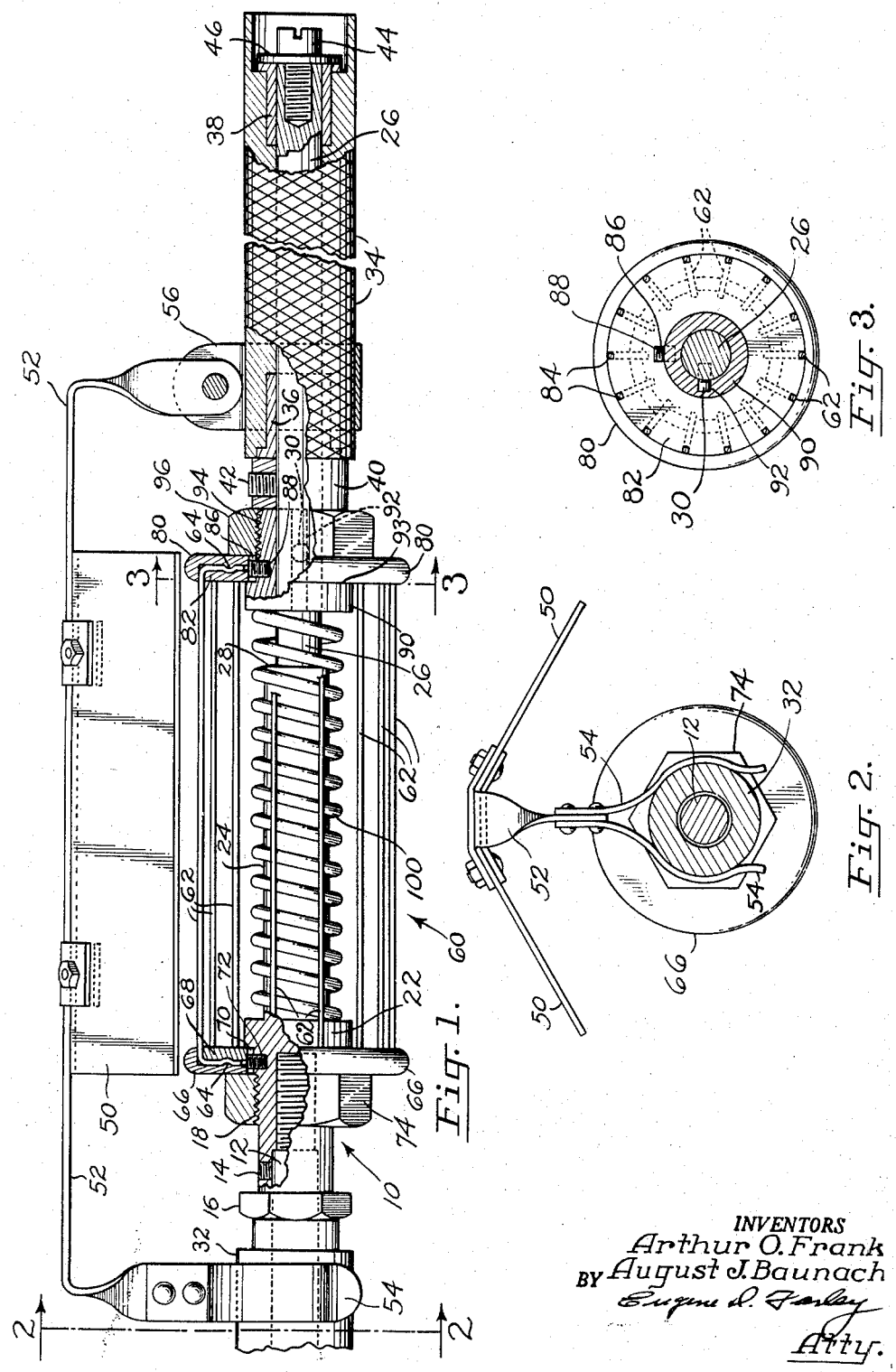
INVENTORS
Arthur O. Frank
BY August J. Baunach
Atty.

2,847,845
FLESHING TOOL

Arthur O. Frank and August J. Baunach, Tacoma, Wash.; said Baunach assignor to said Frank Application June 1, 1956, Serial No. 588,887

6 Claims. (Cl. 69—20)

This invention relates to fleshing tools of the class employed for removing fat and flesh from animal pelts.

After raising fur bearing animals, the animals are killed and spinned. The pelts then are mounted inside out, sleeve-like, on a tapered pole and processed for removal of the fat and flesh which clings to them. At the present time this is done principally by hand, using a knife of suitable style. Such a procedure is disadvantageous for two reasons. First, it may easily result in injury to the hides, particularly around the tail and legs where the hide is thin. Secondly, it is time consuming and laborious.

The latter factor is a particular detriment where a large number of animals necessarily must be killed within a space of a few days when their pelts are prime. Unless an elaborate and costly freezing installation is available for freezing and preserving the pelts, it is mandatory that they be fleshed immediately. Where a large number of pelts are thus in need of processing, the disadvantage of fleshing them by hand is readily apparent.

Accordingly it is the general object of this invention to provide a power driven fleshing tool which will flesh animal pelts rapidly, efficiently, and without damage to the pelts.

Another object of this invention is to provide a fleshing tool which can be used easily with a minimum of operator fatigue.

Another object of this invention is to provide a fleshing tool which may be adjusted as required for proper fleshing of the easily damaged tail and leg areas of a pelt.

Still another object of this invention is the provision of a fleshing tool which is readily adaptable for application to pelts of different sizes and derived from various species of animals.

The manner in which the foregoing and other objects of this invention are accomplished will be apparent from the accompanying specification and claims considered together with the drawings, wherein like numerals of reference indicate like parts and wherein:

Fig. 1 is a view inside elevation, partly in section, of the herein described fleshing tool;

Fig. 2 is a sectional view taken along line 2—2 of Fig. 1; and

Fig. 3 is a sectional view taken along line 3—3 of Fig. 1.

Generally stated, the fleshing tool which we have invented comprises a drive shaft having mounted thereon a plurality of wires or other thin, flexible fleshing elements. These are mounted substantially parallel to the drive shaft, and are spaced therefrom as well as from each other.

Means may be provided for tensioning the wires so that a varying degree of pressure may be exerted by them. Means also are provided for connecting the drive shaft to a source of power. Accordingly as the shaft rotates, the wires are spun around in such a manner that as they are brought in contact with a pelt mounted on a tapered pole, they engage the pelt resiliently, stripping the flesh and fat from it without injuring it.

Considering the foregoing in greater detail and with particular reference to the drawings:

The herein described fleshing tool is mounted upon and driven by an elongated drive shaft indicated generally at 10. One end of the shaft, i. e. the left end as viewed in Fig. 1, is provided with a longitudinal recess dimensioned for receiving in threaded engagement the end of a flexible driving cable 12. A set screw 14 and nut 16 are provided for securing the cable in the recess. The other end of the cable is attached to a source of power, and accordingly provides means for rotating the drive shaft.

The drive shaft is formed with a threaded section 18, a boss 22, an intermediate section 24, and a terminal section 26 of restricted diameter adjacent intermediate section 24, thereby forming a shoulder 28. A pin 30 extends radially from section 26. The purpose of these various parts of the drive shaft will appear hereinafter.

Handle means are employed for grasping the tool and applying it to the pelt. In the illustrated form the handle means includes a first sleeve 32 which fits loosely over the flexible drive cable, so that the cable will turn freely. A second sleeve 34 fits loosely over terminal section 26 of the drive shaft so that the shaft also will turn freely. It is mounted on bushings 36, 38 of a self-lubricating material and abuts against a collar 40 which is fastened to the drive shaft by set screw 42. The outer end of sleeve 34 is fixed in position by screw 44 and washer 46. Accordingly sleeves 32, 34 may be grasped as handles for manipulating the tool.

A shield is mounted on the handles for protecting the operator from flying bits of material removed from the pelts. Such a shield may comprise an angularly formed sheet 50 of plexiglass or other strong transparent material. This sheet is bolted to a longitudinally extending frame member 52, the ends of which are bent at right angles and connected to a pair of spring clips 54, 56. The latter are dimensioned to clip over sleeves 32, 34, thereby mounting the shield 50 on stationary members.

Mounted on the drive shaft for rotation therewith is a rotor 60. This member carries a plurality of wires or other thin, flexible elements 62 which are the active fleshing agents.

One end of each of the wires is connected to grip means which is rigidly mounted on the drive shaft. The other end of each of the wires is mounted in grip means which is slidable on the drive shaft, thereby permitting bowing of the wires.

Accordingly, the ends of the wires are bent at right angles and formed with crimped portions 64. The left hand ends of the wires, viewed in Fig. 1, are gripped between a pair of washers 66, 68. Washer 66 is recessed to permit washer 68 to nest within it. Washer 68 is provided with a plurality of spaced peripheral notches each of which is adapted to receive one of wires 62. The meeting faces of washers 66, 68 have an irregularity which is complementary to the contour of the crimped portion 64 of the wires.

Both of washers 66, 68 are provided with registering slots 70 adapted to receive aligning pin 72 which is embedded in the drive shaft and extends radially therefrom. A nut 74 may be screwed on threaded portion 18 of the shaft into tight engagement with the outer face of washer 66.

Accordingly, when the left ends of wires 62 are inserted between the meeting faces of washers 66, 68, with aligning pin 72 in slots 70 of the washers, nut 74 may be tightened whereupon the washers are pressed tightly against boss 22 on the shaft. This exerts a clamping action on the ends of wires 62, securing them in position.

The other ends of wires 62, i. e. the right ends as viewed in Fig. 1, are mounted in grip means which is slidable longitudinally of the shaft. Such means comprise a recessed washer 80 and a second washer 82 dimensioned for insertion in the recess in washer 80. The meeting faces of these two washers are provided with pockets for the reception of the crimped portions 64 of the wire ends. Washer 82 is provided with a plurality of notches 84 (Fig. 3) dimensioned to receive wires 62. Both washers have slots 86 dimensioned to receive an aligning pin 88 extending radially from the shaft.

The washer assembly is mounted on a slide 90 which is slidable longitudinally on section 26 of the shaft. To guide its sliding motion it is provided with a slot 92 which receives guide pin 30 extending radially from the drive shaft.

Slide 90 is provided with a shoulder 93 and a threaded section 94. A nut 96 engages this threaded section. Accordingly, when the ends of wires 62 are placed in notches 84 and between the meeting faces of washers 80, 82, with aligning pin 88 in slots 86, nut 96 may be tightened whereupon the washers will be forced against shoulder 93 on slide 90, and will grip tightly the ends of wires 62.

Slide 90 is free to move on section 26 of the drive shaft within limits placed by shoulder 28 on the left and collar 40 on the right. Accordingly, when pressure is placed on wires 62, as occurs when the wires are placed against the pelt, the wires will bow inwardly, drawing slide 90 toward the left.

To provide a resilient force opposing this action, a compression spring 100 is placed about section 24 of the drive shaft. One end of this spring abuts against boss 22; the other against slide 90. Hence as the slide is forced to the left by pressure exerted on wires 62, it is opposed by the force of spring 100. This tensions the wires.

Means also are provided to prevent slide 90 from moving inwardly to such an extent that wires 62 inadvertently might contact spring 100, with consequent damage to the assembly. In the illustrated form such means comprise the shoulder 28 on the drive shaft. When slide 90 abuts against this shoulder, its longitudinal motion will be arrested in a position in which the wires are bowed substantially, but still are out of contact with spring 100.

Operation

The operation of the herein described fleshing tool is as follows:

A pelt to be fleshed is placed inside out over a tapered pole. Flexible cable 12 is connected to a source of power and the tool gripped by means of handles 32, 34. With the power on and rotor 60 turning, the operator looks through transparent shield 50 and places wires 62 against the pelt.

A degree of pressure may be exerted as required by the persistence of the fleshy material it is desired to remove and the delicacy of the hide to which it is attached. Thus where the hide is tough and the fleshy material difficult to remove, a substantial pressure may be exerted. Thereupon wires 62 will be bowed inwardly, pulling slide 90 inwardly and tensioning the wires substantially. On the other hand, when removing flesh from tender portions of the skin, as around the tail and legs, a light pressure only is applied by the operator. Thereupon a slight tensioning only of wires 62 occurs and damage to the hide is averted.

Accordingly it will be apparent that by our invention we have provided a fleshing tool which may be used to remove the flesh from pelts in an efficient manner without damaging the pelts. Its operation may be controlled accurately. It compensates automatically for variations in operator technique. When using it, a pelt may be fleshed in but a fraction of the time required by the conventional hand fleshing procedures. As a consequence a large number of pelts may be cleaned while in prime condition by a single operator.

It is to be understood that the form of our invention herewith shown and described is to be taken as a preferred example of the same and that various changes in the shape, size and arrangement of parts may be resorted to without departing from the spirit of our invention, or the scope of the subjoined claims.

Having thus described our invention, we claim:

1. A fleshing tool comprising a drive shaft, a plurality of thin, flexible fleshing elements, means for mounting the fleshing elements on the drive shaft for rotation therewith, the fleshing elements being substantially parallel to the drive shaft and spaced therefrom, means for applying resilient pressure against the fleshing elements in an axial direction, and means for connecting the drive shaft to a source of power.

2. A fleshing tool comprising a drive shaft, a plurality of wires, first grip means rigid to the drive shaft for gripping one end of the wires, second grip means slidably mounted on the drive shaft for gripping the other end of the wires, the wires being maintained substantially parallel to the drive shaft and spaced therefrom and from each other, tensioning means for applying resilient pressure to the second grip means, thereby tensioning the wires, and means for connecting the drive shaft to a source of power.

3. The fleshing tool of claim 2 wherein the first grip means comprises a pair of washers adapted to clamp the said one end of the wires between their meeting faces, and screw means for clamping the meeting faces together.

4. The fleshing tool of claim 2 wherein the second grip means comprises a slide slidably mounted on the shaft, a pair of juxtaposed washers mounted on the collar, the washers being adapted to grip the said other end of the wires between their meeting faces, and screw means bearing against the washers for pressing one against the other.

5. The fleshing tool of claim 2 wherein the second grip means includes a slide slidably mounted on the shaft and the tensioning means comprises a compression spring encircling the shaft and bearing against the slide for urging it in a direction away from the first grip means.

6. A fleshing tool comprising a drive shaft, a plurality of wires, first grip means rigid to the drive shaft for gripping one end of the wires, second grip means spaced apart from the first grip means and slidably mounted on the shaft for gripping the other end of the wires, a coil spring encircling the shaft intermediate the two grip means and bearing against the second grip means, thereby tensioning the wires and permitting their inward bowing when they are pressed against a skin to be fleshed, abutment means on the shaft for limiting the extent of displacement of the second grip means, thereby controlling the degree of bowing of the wires, and means for connecting the drive shaft to a source of power.

No references cited.